3,222,395
MALEAMIC ACID DERIVATIVES
Everett M. Schultz, Ambler, John B. Bicking, Lansdale, and Virgil D. Wiebelhaus, Springfield, Pa., assignors to Merck & Co. Inc., Rahway, N.J., a corporation of New Jersey
No Drawing. Filed Jan. 15, 1962, Ser. No. 166,399
14 Claims. (Cl. 260—518)

This invention comprises novel derivatives of maleamic acid and in particular those derivatives wherein a hydrogen of the amino group of maleamic acid is replaced by a phenylethyl radical or by a phenylpropyl radical and more particularly by derivatives wherein the ethylene or propylene chain of the phenylethyl or phenylpropyl substituent is additionally substituted by one or more groups such as by a lower alkyl, phenyl, benzyl, and the like radicals, or is substituted by any combination of these radicals.

The novel compounds of this invention can be illustrated by the following structural formula:

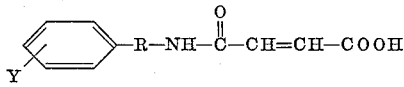

and includes the alkali metal salts thereof as well as simple ester derivatives, such as esters derived from the low molecular weight alcohols. In the above structure, Y is hydrogen or a halogen, particularly chlorine or bromine, and R is a straight chain alkylene radical having at least two and no more than three carbon atoms in the chain connecting the phenyl radical and the nitrogen of the amino group of maleamic acid; in other words, R is an ethylene or propylene radical, each valence of the ethylene or propylene radical being satisfied by one of the following: (a) hydrogen, (b) a lower alkyl radical having from 1 to 10 carbon atoms, and preferably having up to 6 carbon atoms in a straight or branched chain or alicyclic, such as a methyl, iso- or normal-propyl, iso- or normal-butyl, amyl, hexyl, cyclopentyl, cyclohexyl, and the like, (c) a mononuclear aryl, either substituted or unsubstituted, as a phenyl or a halophenyl radical, wherein the halogen is attached in ortho, meta, or para-position and is preferably a chloro- or bromo-substituent, a lower alkyl substituted phenyl or a lower alkoxy substituted phenyl, and the like, or (d) a mononuclear aryl-lower alkyl radical such as an unsubstituted or substituted mononuclear aryl-lower alkyl radical wherein, if substituted, the substituent group can be attached in ortho, meta, or para-position of the aryl nucleus and advantageously can be a halogen, particularly chlorine or bromine, a lower alkyl or a lower alkoxy substituent attached preferably to the benzenoid portion of the benzyl radical, for example.

The compounds of this invention possess a variety of properties and are especially useful because they inhibit the excretion of penicillin through the kidney tubules thus providing prolonged blood levels of penicillin. Because of this property the new compounds of this invention are useful as adjuvants for use in conjunction with the administration of penicillin to provide an increase in the blood plasma penicillin concentration with a given dose of penicillin, thereby making possible very high penicillin blood levels, or permitting the use of smaller quantities of penicillin for providing a given blood level, or permitting less frequent administration of penicillin while maintaining a penicillin blood level adequate for bactericidal or bacteriostatic purposes.

Some of the compounds additionally enhance the excretion of uric acid from the body and therefore are useful agents in the treatment of gout or gouty arthritis and in alleviating symptoms of these conditions and of complications associated with gout and gouty arthritis.

Additionally, some of the compounds have been found to inhibit the biosynthesis of cholesterol in liver homogenates in vitro. They have also been found to lower the incidence and severity of atherosclerotic plaques in the thoracic aorta of estrogen-treated chickens which were treated with these compounds as compared with their estrogen-treated controls, and to lower the plasma level of cholesterol in rats which had been challenged with quantities of saturated fats such as lard, known to produce an increased cholesterol blood level in these animals. Accordingly, these compounds also are potentially useful in lowering blood cholesterol levels in humans which is considered an important function of chemotherapeutic agents in the treatment of atherosclerosis.

While all of the maleamic acid derivatives of this invention possess one or more of the above properties to varying degrees, the compounds having a phenylethyl radical attached to the amino nitrogen of maleamic acid, and especially those phenylethylmaleamic acids which also have attached to the ethylene chain a phenyl or a benzyl radical, with or without a halogen substituent on one or both of the benzenoid nuclei, possess one or more of the above described properties to a marked degree.

The maleamic acid derivatives of this invention are easily prepared by bringing together a solution of the selected phenylalkylamine and a solution of maleic anhydride. The reaction between the ingredients occurs quite readily at room temperature accompanied by the precipitation of the maleamic acid derivative from the reaction mixture, which then can be separated by known conventional methods, as by filtration or evaporation of the solvent and the like. Ether has been found to be an effective solvent for the phenylalkylamine as well as for maleic anhydride, although other solvents could be used in its place.

Some of the phenylalkylamines used in preparing the maleamic acid derivatives of this invention are new compounds which can readily be prepared by one or another of the many well-known methods for preparing phenylalkylamines. By one such method, a carbonyl compound is converted by means of the Leuckart reaction to the desired phenylalkylamine. This reaction involves heating the carbonyl compound (i.e., a ketone or an aldehyde), with formamide and formic acid preferably under reflux conditions to form the formamide derivative of the desired phenylalkylamine. This compound, after hydrolysis with a mineral acid, such as hydrochloric acid, generally is isolated either (a) as an acid addition salt thereof, such as the hydrochloride salt, which may be insoluble in the reaction medium or (b) by treatment of the reaction medium with alkali, such as sodium hydroxide, to obtain the free base, which then is extracted with a solvent, such as ether, and purified by distillation of the base.

Another method which can be employed to prepare the phenylalkylamines involves the hydrogenation of the selected nitrile in the presence of Raney nickel at elevated temperatures and pressures.

Alternatively the selected nitriles can be reacted with a Grignard reagent thus forming the corresponding ketimine, which is reduced in the presence of a noble metal catalyst, such as platinum or palladium and the like, to the corresponding desired phenylalkylamine.

Another method which can be employed to advantage involves reacting the selected ketone with hydroxylamine thus forming the corresponding ketoxime, which then is catalytically hydrogenated, advantageously in the presence of Raney nickel, to form the desired amine.

The above and other methods for preparing the amines and the novel maleamic acid derivatives of this invention will be described in more detail by the following examples.

The novel maleamic acid derivatives of this invention, as well as their intermediate phenylalkylamines, which contain one asymmetric carbon atom in the ethylene or propylene radical will be obtained as racemic mixtures which can be separated into the dextrorotatory and levorotatory isomers by known methods.

The novel maleamic acid derivatives of this invention, as well as the corresponding phenylalkylamines, which contain two asymmetric carbon atoms in the ethylene or propylene radical will be obtained as diasterioisomers. In this specification and in the claims the diasterioisomer having the higher melting point has been designated the α-isomer and that having the lower melting point has been designated the β-isomer. The α-isomer and the β-isomer, of course, also will be obtained as racemic mixtures which can be separated by known methods.

While greater activity may reside in one or another of the α-isomer or β-isomer or in the dextro- or levorotatory antipode of one or another of these isomers, in general, mixtures of their racemates can be employed for one or another of the uses identified above for which the individual compound may possess the desired property.

The preparation of the novel maleamic acid derivatives of this invention is illustrated by the following examples. It is to be understood, of course, that these examples are illustrative and not limitative of the compounds of this invention and of the methods by which they can be prepared. The examples also illustrate methods for preparing suitable dosage forms of the maleamic acid derivatives of this invention.

EXAMPLE 1

*N-(1-methyl-2,3-di-p-chlorophenylpropyl)-maleamic acid*

*Step A.*—p-chlorophenylacetone (141.6 g., 0.84 mole), prepared from p-chlorobenzaldehyde and nitroethane by the method described by F. W. Hoover and H. B. Hass [J. Org. Chem. 12, 501 (1947)], is alkylated with p-chlorobenzyl chloride (161 g., 1.0 mole) in the presence of granulated sodium hydroxide (36.8 g., 0.92 mole) by substantially the same method described by E. M. Schultz, J. B. Bicking, S. Mickey, and F. S. Crossley [J. Amer. Chem. Soc. 75: 1072 (1953)]. The boiling point of the thus obtained 3,4-di-p-chlorophenyl-2-butanone is 177° C. (0.75 mm.) and it is obtained in 64% yield. A small portion of the product thus obtained is converted, for analytical purposes, to the 2,4-dinitrophenyl hydrazone of 3,4-di-p-chlorophenyl-2-butanone, M.P. 154–155° C., by the method described in the textbook entitled "Identification of Organic Compounds," Shriner and Fuson, 2nd edition, John Wiley & Sons, page 143.

*Analysis.*—Calculated for $C_{22}H_{18}Cl_2N_4O_4$: C, 55.82; H, 3.83; Cl, 14.98. Found: C, 56.16; H, 3.87; Cl, 15.01.

*Step B.*—The above ketone was submitted to the Leuckart reaction in the following manner: 3,4-di-p-chlorophenyl-2-butanone (135 g.) and formamide (84 g.) is heated under reflux at 170° C. for 14 hours. Formic acid (about 35 ml.) is added in small portions from time to time to keep the vapors above the reaction mixture acidic to alkacid indicator paper. The reaction mixture then is permitted to cool and is extracted with benzene. The benzene layer is separated and the benzene evaporated. The residue is boiled with 65 ml. concentrated hydrochloric acid for eight hours thus forming the two diastereoisomers of 3,4-di-p-chlorophenyl-2-aminobutane hydrochloride in a yield of 70%.

The α- and β-isomers are separated as described in Steps C and D; the higher melting isomer is designated as the α-form and the lower melting isomer is designated as the β-form.

*Step C.*—The mixture of the two diastereoisomers, obtained as described in Step B above, is added to 300 ml. of water and heated for ½ hour at 80° C. While still hot, the aqueous layer is separated by decantation and discarded. The remaining solid material is added to 300 ml. of water, heated to boiling and filtered while still hot, yielding a solid material (1) and a clear filtrate (2). The filtrate is cooled to 20° C. and filtered yielding a solid (3) and an oily aqueous filtrate (4).

The solid (3) remaining on the filter is washed with water and the washing (3a) is added to the oily aqueous filtrate (4) and set aside for use in Step D.

Solids (1) and (3) are each dried at 55° C. and combined. The combined solids (1) and (3) then are crystallized from water (300 ml.) and isopropyl alcohol (110 ml.) yielding 29 g. of the α-isomer of 3,4-di-p-chlorophenyl-2-aminobutane hydrochloride which begins to char at 265° C. but has no definite melting point.

*Step D.*—To the mixture of the oily aqueous filtrate (4) and washing (3a), obtained in Step C, sufficient water is added to dissolve the oil. The aqueous solution then is extracted with ether and the ether layer separated and discarded. The remaining aqueous solution is made basic with 20% sodium hydroxide, extracted again with ether, and the aqueous layer discarded. The remaining ether solution then is dried over potassium carbonate, acidified with 6 N ethanolic hydrogen chloride and cooled to 5° C. whereupon the β-isomer precipitates and is removed by filtration. The β-isomer of 3,4-di-p-chlorophenyl-2-aminobutane hydrochloride thus obtained melts at 184–186° C., yield 65 g.

*Step E.*—The α-isomer of 3,4-di-p-chlorophenyl-2-aminobutane hydrochloride (5 g., 0.015 mole), obtained as described in Step C above, is suspended in water (70 ml.) in a separatory funnel. Excess 20% sodium hydroxide is added and the free base is extracted with ether. The ether solution is dried over potassium carbonate, concentrated to 30 ml., and added slowly with stirring to a solution of maleic anhydride (1.47 g., 0.015 mole) in ether (about 30 ml.). A white precipitate forms gradually and is collected by filtration. The α-isomer of N-(1-methyl-2,3-di-p-chlorophenylpropyl)-maleamic acid thus obtained melts at 209–210° C. (uncorrected). The melting point is unchanged by crystallization from absolute ethanol.

*Analysis.*—Calculated for $C_{20}H_{19}Cl_2NO_3$: C, 61.25; H, 4.88; Cl, 18.08; N, 3.57. Found: C, 61.47; H, 4.94; Cl, 17.78; N, 3.54.

*Step F.*—The β-form of 3,4-di-p-chlorophenyl-2-aminobutane hydrochloride (8.25 g., 0.025 mole), obtained as described in Step D above, is dissolved in water and the solution made basic with 20% sodium hydroxide and extracted with ether. The ether solution of the base is dried over potassium carbonate and concentrated to about 30 ml. The ether solution of the base then is added slowly with stirring to a solution of maleic anhydride (2.45 g., 0.025 mole) in ether (50 ml.). The white precipitate which forms is collected by filtration and dried in air at 65° C. The product thus obtained melts at 161–162° C. After crystallization from isopropyl alcohol the β-isomer of N-(1-methyl-2,3-di-p-chlorophenylpropyl)-maleamic acid melts at 161.5–162.5° C. (uncorrected), yield 5.1 g.

*Analysis.*—Calculated for $C_{20}H_{19}Cl_2NO_3$: C, 61.25; H, 4.88; Cl, 18.08; N, 3.57. Found: C, 61.26; H, 4.90; Cl, 17.89; N, 3.55.

EXAMPLE 2

*N-(1-methyl-2,3-di-p-chlorophenylpropyl)-maleamic acid*

*Step A.*—Sodium acetate trihydrate (13.6 g., 0.1 mole) and hydroxylamine hydrochloride (13.8 g., 0.2 mole) are dissolved in water (36 ml.) and 3,4-di-p-chlorophenyl-2-butanone (29.3 g., 0.1 mole), prepared as described in Example 1, Step A, in methanol (200 ml.) is added. The mixture is boiled for two hours after which the alcohol is removed by distillation. On cooling and the addition of water (200 ml.) a gummy precipitate forms. The water is decanted and extracted with ether. The ether layer is removed and used to dissolve the gummy precipitate, then washed with water, the water-washed ether solution is dried over sodium sulfate and the ether evaporated, The residue is crystallized from hexane yielding 26 g. (84%) of 3,4-di-p-chlorophenyl-2-butanone ketoxime (M.P. 94–96° C.).

Step B.—The ketoxime obtained as described above (50 g., 0.162 mole) is added to absolute ethanol (150 ml.) in a rocking stainless steel-lined pressure vessel. Raney nickel (10 g.) is added and the ketoxime hydrogenated at 80° C. under an initial hydrogen pressure of 800 p.s.i. (pounds per square inch) during a period of one half hour. After removal of the alcohol and catalyst from the cooled solution, there remains a residue of 48 g. of the two diastereoisomers of 3,4-di-p-chlorophenyl-2-aminobutane.

Step C.—The crude mixture of the two diastereoisomers (48 g., 0.163 mole) is dissolved in ether (100 ml.) and added slowly with stirring to a solution of maleic anhydride (15.95 g., 0.163 mole) in ether (150 ml.). The white precipitate which forms is collected on a filter yielding 43 g. (67%) of the two diastereoisomers of N-(1-methyl-2,3-di-p-chlorophenylpropyl)-maleamic acid.

Step D.—Isopropyl alcohol (6 ml./g.) is added to the mixture of the diastereoisomers obtained as described above and boiled for 1½ hours. Suction filtration of the boiling hot mixture yields 34 g. (53%) of the undissolved α-isomer of N-(1-methyl-2,3-di-p-chlorophenylpropyl)-maleamic acid, M.P. 209–210° C. (uncorrected).

Step E.—The isopropyl alcohol filtrate obtained in Step D is reheated to boiling to dissolve any β-isomer which may have precipitated while standing. The clear solution then is allowed to cool slowly to 5° C. and the precipitate collected by filtration yielding 7.34 g. (11%) of the β-isomer of N-(1-methyl-2,3-di-p-chlorophenylpropyl)-maleamic acid, M.P. 160–161° C. (uncorrected).

EXAMPLE 3

*N-(1-methyl-2-p-chlorophenyl-3-phenylpropyl)-maleamic acid*

Step A.—p-Chlorophenylacetone (45 g., 0.27 mole), prepared as described in Example 1, is alkylated with benzyl chloride (44 g., 0.3 mole) by the method described in Example 1, Step A, yielding 47.6 g. of 3-p-chlorophenyl-4-phenyl-2-butanone melting at 77–80° C. An analytical sample, crystallized from isopropyl alcohol, melts at 80–81° C.

Analysis.—Calculated for $C_{16}H_{15}ClO$: C, 74.28; H, 5.75. Found: C, 74.02; H, 5.75.

Step B.—The ketone obtained as described in Step A above, (80 g.), is submitted to a Leuckart reaction in substantially the same manner described in Example 1, Step B, yielding a mixture of the α- and β-isomers of 3-p-chlorophenyl-4-phenyl-2-aminobutane hydrochloride.

Step C.—The mixture of diastereoisomers obtained as described in Step B above, is added to water (250 ml.) with stirring. There is obtained a mixture (2) comprising a clear supernatant and a precipitate of purple oil. The mixture (2) is extracted with ether as the purple oil, the hydrochloride of the α- and β-isomers of 3-p-chlorophenyl-4-phenyl-2-aminobutane possesses the unusual property of ether solubility. There is obtained an ether solution of the amine hydrochloride (3) and an acidic aqueous layer (4). The aqueous layer (4) is discarded and the ether solution (3) is extracted 30 times with 250 ml. portions of water to obtain water extracts (5). Each 250 ml. portion of (5) is neutralized as soon as obtained by the addition of 20% sodium hydroxide and then extracted with two separate 250 ml. portions of ether (6) which are used over and over again on each individual portion of (5). The two ether extracts (6) which are thus finally obtained are combined and dried over potassium carbonate and then acidified by the addition of alcoholic hydrogen chloride. After chilling for 16 hours, a solid (7) precipitates and is collected by filtration yielding 7 g. of product (7a), M.P. 234–241° C. The filtrate (8) is reserved for use in Step D below as it contains the β-isomer. After crystallization of product (7a) from water, there is obtained 4.8 g. of the α-isomer of 3-p-chlorophenyl-4-phenyl-2-aminobutane hydrochloride, which decomposes slowly at 240–250° C.

Analysis.—Calculated for $C_{16}H_{18}ClN \cdot HCl$: C, 64.87; H, 6.46; N, 4.73. Found: C, 65.20; H, 6.50; N, 4.71.

Step D.—The ether filtrate (8) obtained as described in Step C above, is evaporated to dryness yielding 51.7 g. of solid (9), M.P. 188–195° C. The solid (9) is crystallized from a mixture of benzene (175 ml.) and hexane (125 ml.) yielding 39 g. of solid (10), M.P. 194–196° C. Crystallization of (10) from a mixture of benzene (138 ml.) and hexane (98 ml.) yields 20.1 g. of solid (11), the β-isomer of 3-p-chlorophenyl-4-phenyl-2-aminobutane hydrochloride, M.P. 195–197° C. One gram of product is crystallized two more times from a mixture of benzene-hexane yielding an analytical sample melting at 196–198° C.

Analysis.—Calculated for $C_{16}H_{18}ClN \cdot HCl$: C, 64.87; H, 6.46; N, 4.73. Found: C, 64.63; H, 6.46; N, 4.70.

Step E.—The α-isomer of 3-p-chlorophenyl-4-phenyl-2-aminobutane hydrochloride (4.1 g., 0.0138 mole), obtained as described in Step C. above, is dissolved in water and the solution made basic by the addition of 20% sodium hydroxide. The base is extracted with ether and the ether extract dried over potassium carbonate and concentrated to about 30 ml. which then is added slowly with stirring to a solution of maleic anhydride in about 30 ml. of ether. The α-isomer of N-(1-methyl-2-p-chlorophenyl-3-phenylpropyl)-maleamic acid is collected by filtration and crystallized from isopropyl alcohol yielding 3.5 g. of the α-isomer, M.P. 187–188° C.

Analysis.—Calculated for $C_{20}H_{20}ClNO_3$: C, 67.13; H, 5.63; Cl, 9.91; N, 3.92. Found: C, 67.50; H, 5.72; Cl, 9.93; N, 3.90.

Step F.—The β-isomer of 3-p-chlorophenyl-4-phenyl-2-aminobutane hydrochloride (10 g., 0.034 mole), obtained as described in Step D above, is dissolved in water and the solution made basic by the addition of 20% sodium hydroxide. The base is extracted with ether and the ether extract dried over potassium carbonate and concentrated to about 30 ml. which then is added to a solution of maleic anhydride (3.32 g., 0.034 mole) in ether (30 ml.). The product which precipitates is crystallized from a mixture of methanol and water yielding 7.3 g. of the β-isomer of N - (1 - methyl-2-p-chlorophenyl-3-phenylpropyl)-maleamic acid, M.P. 158–160° C.

Analysis.—Calculated for $C_{20}H_{20}ClNO_3$: C, 67.13; H, 5.63; N, 3.92. Found: C, 67.11; H, 5.78; N, 3.90.

EXAMPLE 4

*N-(1-methyl-3-p-chlorophenyl-2-phenylpropyl)-maleamic acid*

Step A.—1-Phenyl-2-propanone is alkylated with p-chlorobenzyl chloride in the presence of sodium hydroxide by substantially the same method described in Example 1, Step A, using equimolecular quantities of reactants to obtain 4-p-chlorophenyl-3-phenyl-2-butanone, B.P. 148°–151° C. (0.3 mm.). After crystallization from ethanol, a crystalline product is obtained, M.P. 78–79° C., yield about 44%.

Analysis.—Calculated for $C_{16}H_{15}ClO$: C, 74.28; H, 5.84. Found: C, 74.42; H, 5.83.

Step B.—The 4 - p-chlorophenyl-3-phenyl-2-butanone (113 g., 0.435 mole) is submitted to a Leuckart reaction in substantially the same manner described in Example 1, Step B. The reaction mixture from the hydrolysis of the formamide compound then is added to water and the solid material (1) which does not dissolve is collected by filtration, washed with water, and air dried. The filtrate and washing are combined forming mixture (2) which contains the β-isomer, and is set aside for use in Step C below. The solid (1) is crystallized from water yielding the α-isomer of 4-p-chlorophenyl-3-phenyl-2-aminobutane hydrochloride, M.P. 290–292° C.

*Analysis.*—Calculated for $C_{16}H_{18}ClN \cdot HCl$: C, 64.87; H, 6.46; Cl, 23.94; N, 4.73. Found: C, 64.93; H, 6.56; Cl, 23.94; N, 4.70.

*Step C.*—The mixture (2), obtained as described in Step B above, is extracted with ether and made basic by the addition of 20% sodium hydroxide. The base which separates is extracted with ether and the ether extract then dried over potassium carbonate and acidified with alcoholic hydrogen chloride. The precipitate is collected by filtration and crystallized from isopropyl alcohol yielding the β-isomer of 4-p-chlorophenyl-3-phenyl-2-aminobutane hydrochloride, M.P. 179–180° C.

*Analysis.*—Calculated for $C_{16}H_{18}ClN \cdot HCl$: C, 64.87; H, 6.46; Cl, 23.94; N, 4.73. Found: C, 64.92; H, 6.56; Cl, 24.11; N, 4.76.

*Step D.*—The α-isomer of 4-p-chlorophenyl-3-phenyl-2-aminobutane hydrochloride (8.4 g., 0.028 mole), obtained as described in Step B above, is converted to an ether solution (30 ml.) of the base by substantially the same method described in Example 1, Step E, and then added to a solution of maleic anhydride (3.2 g., 0.032 mole) in ether (30 ml.) yielding 6.5 g. of the α-isomer of N-(1-methyl-3-p-chlorophenyl-2-phenylpropyl)-maleamic acid, which, after crystallization from ethanol, melts at 175–176° C.

*Analysis.*—Calculated for $C_{20}H_{20}ClNO_3$: C, 67.13; H, 5.64; Cl, 9.91; N, 3.92. Found: C, 67.18; H, 5.66; Cl, 10.13; N, 3.90.

*Step E.*—The thus obtained α-isomer of N-(1-methyl-3-p-chlorophenyl-2-phenylpropyl)-maleamic acid (50 g., 0.14 mole) is added to quinine (45.26 g., 0.14 mole) in boiling acetone (325 ml.). The solution is allowed to cool to 5° C., and the precipitated quinine salt is collected by filtration. Repeated crystallizations from acetone yields 10 g. of the quinine salt of the α-isomer of N - (1 - methyl-3-p-chlorophenyl-2-phenylpropyl)-maleamic acid, M.P. 127–130° C. Further crystallization does not alter the melting point. The salt is decomposed by addition of sodium hydroxide and the aqueous mixture is extracted with ether and then acidified with hydrochloric acid. The precipitated product is collected by filtration and crystallized from benzene yielding the α-isomer, dextrorotatory, of N-(1-methyl-3-p-chlorophenyl-2-phenylpropyl)-maleamic acid, M.P. 170–171° C., $[\alpha]_D^{25}$ +41.33 (1% in ethanol).

*Analysis.*—Calculated for $C_{20}H_{20}ClNO_3$: C, 67.13; H, 5.64; N, 3.92. Found: C, 67.44; H, 5.79; N, 3.92.

*Step F.*—The β-isomer of 4-p-chlorophenyl-3-phenyl-2-aminobutane hydrochloride (10 g., 0.034 mole), obtained as described in Step C above, is converted to an ether solution (30 ml. of the base in substantially the same manner described in Example 1, Step E, and then is added to a solution of maleic anhydride (3.32 g., 0.034 mole) in ether (30 ml.) yielding 8.6 g. of the β-isomer of N-(1-methyl-3-p-chlorophenyl-2-phenyl)-maleamic acid, which after crystallization from isopropyl alcohol, melts at 150–151° C.

*Analysis.*—Calculated for $C_{20}H_{21}ClNO_3$: C, 67.13; H, 5.64; Cl, 9.91; N, 3.92. Found: C, 67.30; H, 5.68; Cl, 10.08; N, 3.92.

EXAMPLE 5

N-(1-methyl-2,3-di-o-bromophenylpropyl)-maleamic acid

By replacing the 1-phenyl-2-propanone and the p-chlorobenzyl chloride employed in Example 4, Step A, by an equimolecular quantity of 1-(o-bromophenyl)-2-propanone and o-bromobenzyl chloride and following substantially the same procedures described in Example 4, Steps A through F, there are obtained the α-isomer, the α-isomer dextrorotatory form, and the β-isomer of N-(1-methyl-2,3-di-o-bromophenylpropyl)-maleamic acid.

EXAMPLE 6

N-(1-methyl-3-o-bromophenyl-2-m-chlorophenylpropyl)-maleamic acid

*Step A.*—m-Chlorophenylacetone prepared by the method described in Example 1, Step A, from m-chlorobenzaldehyde is alkylated with o-bromobenzyl chloride by the method described in Example 1, Step A, yielding 4-o-bromophenyl-3-m-chlorophenyl-2-butanone.

*Step B.*—The thus obtained ketone then is converted by the procedures described in Example 3, Steps B though D, to the α-isomer and the β-isomer of 4-o-bromophenyl-3-m-chlorophenyl-2-aminobutane hydrochloride. Each of these isomers is converted by the procedures described in Example 3, Steps E and F, to the corresponding isomer of N - (1 - methyl - 3 - o - bromophenyl - 2 - m - chlorophenylpropyl)-maleamic acid.

EXAMPLE 7

N-(1-methyl-2,3-dipenylpropyl)-maleamic acid

*Step A.*—3,4-diphenyl-2-butanone (135 g., 0.6 mole) is converted by the Leuckart reaction in substantially the same manner described in Example 1, Step B, to 3,4-diphenyl-2-aminobutane hydrochloride. The hydrochloride salt is converted to the free base by substantially the same process described in Example 1, Step E, yielding 87 g. of the base, B.P. 120–122° C., (0.5 mm.).

*Step B.*—The 3,4-diphenyl-2-aminobutane, obtained as described in Step A (137 g.), is suspended in water (200 ml.) and concentrated hydrochloric acid added slowly at 15° C. until a lasting precipitate is formed. The mixture is heated to 80° C. to dissolve the precipitate and then allowed to cool slowly to 20° C. A solid (2) separates and is collected by filtration yielding 51 grams of the α-isomer, melting point 210–228° C. The filtrate (3) is set aside for treatment as described in Step D below to isolate the β-isomer. The solid (2) is crystallized from water yielding 32 g. of the α-isomer of 3,4-diphenyl-2-aminobutane hydrochloride, M.P. 247–248° C.

*Analysis.*—Calculated for $C_{16}H_{19}N \cdot HCl$: Cl, 13.55; N, 5.35. Found: Cl, 13.56; N, 5.33.

*Step C.*—The α-isomer of 3,4-diphenyl-2-aminobutane hydrochloride (7.84 g., 0.03 mole), obtained as described in Step B above, is converted to an ether solution (30 ml.) of the base in substantially the same manner described in Example 1, Step E. The ether solution then is added slowly to a solution of maleic anhydride (3.6 g., 0.037 mole) in ether (30 ml.). The solid which separates is collected by filtration and crystallized from ethanol and from isopropyl alcohol yielding 7.3 g. of the α-isomer of N-(1-methyl - 2,3 - diphenylpropyl)-maleamic acid, M.P. 181–182° C.

*Analysis.*—Calculated for $C_{20}H_{21}NO_3$: C, 74.27; H, 6.55; N, 4.33. Found: C, 74.21; H, 6.57; N, 4.32.

*Step D.*—The filtrate (3) obtained as described in Step B above, is cooled to 20° C. and concentrated hydrochloric acid (about 20 ml.) is added until a lasting precipitate is formed. The mixture is heated to 80° C. to dissolve the precipitate and then allowed to cool to 20° C. The solid (5) (68 g.) which separates is collected by filtration and the filtrate (6) is cooled to 5° C. A second crop of solid (7) (33 g.) separates and is collected by filtration. The filtrate (8) is discarded. The solids (5) and (7) are combined and crystallized from isopropyl alcohol yielding 71 g. of the β-isomer of 3,4-diphenyl-2-aminobutane hydrochloride. For analysis, 4 g. of the compound thus obtained is crystallized four additional times from isopropyl alcohol yielding 1.6 g. of the β-isomer of 3,4 - diphenyl - 2 - aminobutane hydrochloride, M.P. 161–162° C.

*Analysis.*—Calculated for $C_{16}H_{19}N \cdot HCl$: C, 73.40; H, 7.70; N, 5.35. Found: C, 73.28; H, 7.68; N, 5.31.

*Step E.*—The β-isomer of 3,4-diphenyl-2-aminobutane hydrochloride (4 g., 0.015 mole), is converted to an ether solution (30 ml.) of the base by substantially the same method described in Example 1, Step E. The ether solution of the base then is added to a solution of maleic anhydride (1.5 g., 0.015 mole) in ether (30 ml.). The solid which separates is collected by filtration and crystallized from isopropyl alcohol and from benzene yielding 3.35 g. of the β-isomer of N-(1-methyl-2,3-diphenylpropyl)-maleamic acid, M.P. 151–152° C.

*Analysis.*—Calculated for $C_{20}H_{21}NO_3$: C, 74.27; H, 6.55; N, 4.33. Found: C, 74.55; H, 6.46; N, 4.28.

EXAMPLE 8

N-(2,3-diphenylpropyl)-maleamic acid 2,3 - diphenyl-1-aminopropane hydrochloride (6.23 g., 0.025 mole) is converted to an ether solution (30 ml.) of the base by substantially the same method described in Example 1, Step E. This solution is added to an ether solution of maleic anhydride (2.45 g., 0.025 mole) yielding 2 g. of N-(2,3-diphenylpropyl)-maleamic acid. After crystallization from isopropyl alcohol, the product is suspended in boiling hexane, benzene then is added to the boiling mixture until all of the product dissolves. Upon cooling, the product crystallizes and is separated and again crystallized from isopropyl alcohol, M.P. 114–115° C.

*Analysis.*—Calculated for $C_{19}H_{19}NO$: C, 73.76; H, 6.19; N, 4.53. Found: C, 73.43; H, 6.03; N, 4.48.

EXAMPLE 9

N-(dibenzylmethyl)-maleamic acid 1,3-diphenyl-2-aminopropane (10.55 g., 0.05 mole) is dissolved in 30 ml. of ether and added to 30 ml. of an ether solution of maleic anhydride (4.9 g., 0.05 mole), yielding 10.8 g. of N-(dibenzylmethyl)-maleamic acid, which, after crystallization from isopropyl alcohol, has M.P. 161–162° C.

*Analysis.*—Calculated for $C_{19}H_{19}NO_3$: C, 73.76; H, 6.19; N, 4.53. Found: C, 73.68; H, 6.06; N, 4.53.

EXAMPLE 10

N-(2-phenylethyl)-maleamic acid

β-Phenylethylamine (6.05 g., 0.05 mole) is dissolved in ether (30 ml.) and added to a solution of maleic anhydride (4.9 g., 0.05 mole) in ether (30 ml.). The solid which separates is crystallized from a 5:1 mixture of benzene and hexane, and from isopropyl alcohol yielding 4.6 g. of N-(2-phenylethyl)-maleamic acid, M.P. 132–133° C.

*Analysis.*—Calculated for $C_{12}H_{13}NO_3$: C, 65.75; H, 5.98; N, 6.39. Found: C, 65.64; H, 6.04; N, 6.38.

EXAMPLE 11

N-(1-methyl-2-phenylpentyl)-maleamic acid

A solution of a mixture of the α- and β-isomers of 3-phenyl-2-aminohexane (7.08 g., 0.04 mole) is added to a solution of maleic anhydride (3.92 g., 0.04 mole) in 30 ml. of ether yielding a solid material, M.P. 111–120° C. (9.7 g.). The solid material thus obtained is crystallized from methanol and then from a 9:4 mixture of ether and acetone yielding the α-isomer of N-(1-methyl-2-phenylpentyl)-maleamic acid (2.5 g.), M.P. 129–129.5° C.

*Analysis.*—Calculated for $C_{16}H_{21}NO_3$: C, 69.79; H, 7.69; N, 5.09. Found: C, 69.86; H, 7.61; N, 5.07.

EXAMPLE 12

N-(2-phenylpropyl)-maleamic acid

By substituting 2-phenylpropylamine (13.5 g., 0.1 mole) for the β-phenylethylamine employed in Example 10, and following substantially the same procedure described in Example 10, there is obtained 11 g. of N-(2-phenylpropyl)-maleamic acid, M.P. 116–118° C., after crystallization from absolute alcohol and from isopropyl alcohol.

*Analysis.*—Calculated for $C_{13}H_{15}NO_3$: C, 66.93; H, 6.48; N, 6.01. Found: C, 67.03; H, 6.64; N, 5.99.

EXAMPLE 13

N-(2-methyl-2-phenylpropyl)-maleamic acid

By substituting 2-methyl-2-phenylpropylamine (7.45 g., 0.05 mole) for the phenylethylamine employed in Example 10 and reacting it with maleic anhydride (4.9 g., 0.05 mole) by substantially the same method described in Example 10, there is obtained 6.5 g. of N-(2-methyl-2-phenylpropyl)-maleamic acid, M.P. 141–142° C., after crystallization from alcohol.

*Analysis.*—Calculated for $C_{14}H_{17}NO_3$: C, 67.99; H, 6.93; N, 5.66. Found: C, 68.17; H, 6.87; N, 5.65.

EXAMPLE 14

N-(1-methyl-2-phenylethyl)-maleamic acid

By substituting 1-methyl-2-phenylethylamine (0.05 mole) for the β-phenylethylamine employed in Example 10 and following substantially the same procedure described in Example 10, there is obtained 8.7 g. of N-(1-methyl-2-phenylethyl)-maleamic acid, M.P. 124–125° C. after crystallization from isopropyl alcohol.

*Analysis.*—Calculated for $C_{13}H_{15}NO_3$: C, 66.93; H, 6.48; N, 6.01. Found: C, 67.19; H, 6.62; N, 6.04.

EXAMPLE 15

N-(1,3-dimethyl-2-p-butoxyphenylbutyl)-maleamic acid

*Step A.*—p-Butoxybenzaldehyde (136 g., 0.765 mole) and nitroethane (65 g., 0.85 mole) are condensed by substantially the same manner described by F. W. Hoover and H. B. Hass, J. Org. Chem. 12: 501 (1947) yielding 1-p-butoxyphenyl-2-nitro-1-propene, M.P. 53–55° C.

*Analysis.*—Calculated for $C_{13}H_{17}NO_3$: C, 66.35; H, 7.28; N, 5.95. Found: C, 66.43; H, 7.36; N, 5.91.

*Step B.*—The 1-p-butoxyphenyl-2-nitro-1-propene is reuced by iron and hydrochloric acid in substantially the same manner described by Hoover and Hass (see Example 1, Step A) yielding 1-p-butoxyphenyl-2-propanone, B.P. 120–123° C. (2 mm.). The 2,4-dinitrophenylhydrazone of 1-p-butoxyphenyl-2-propane, prepared by the method described in "Identification of Organic Compounds," Shriner and Fuson, 2nd edition, John Wiley & Sons, page 143, has M.P. 119–121° C.

*Analysis.*—Calculated for $C_{19}H_{22}N_4O_5$: C, 59.06; H, 5.74; N, 14.50. Found: C, 59.19; H, 5.77; N, 14.48.

*Step C.*—The 1-p-butoxyphenyl-2-propanone is alkylated with isopropyliodide in the presence of potassium tert. butoxide by the method described in J. Amer. Chem. Soc. 75: 1072 (1953) yielding 3-p-butoxyphenyl-4-methyl-2-pentanone, B.P. 119–124° C. (1 mm.). The 2,4-dinitrophenylhydrazone derivative thereof, prepared by the method described above in Step B, has M.P. 67–69° C.

*Analysis.*—Calculated for $C_{22}H_{28}N_4O_5$: C, 61.66; H, 6.59. Found: C, 61.49; H, 6.64.

*Step D.*—The ketone thus obtained (70 g.) is submitted to the Leuckart reaction in substantially the same manner described in Example 1, Step B, yielding 52 g. of a mixture comprising the α- and β-isomers of 3-p-butoxyphenyl-4-methyl - 2 - aminopentane hydrochloride. The hydrochloride salt is converted by substantially the same method described in Example 1, Step E, to the free base, B.P. 125–130° C. (0.3 mm.). The base thus obtained is dissolved in ether and then precipitated by the addition of alcoholic hydrogen chloride thus forming the hydrochloride salt of the base (51 g.). The hydrochloride salt is separated by filtration and after repeated recrystallization from acetone yields the α-isomer of 3-p-butoxyphenol-4-methyl-2-aminopentane hydrochloride, M.P. 174–175° C.

*Analysis.*—Calculated for $C_{16}H_{27}NO \cdot HCl$: C, 67.22; H, 9.87; N, 4.90. Found: C, 67.36; H, 9.78; N, 4.89.

*Step E.*—The α-isomer of 3-p-butoxyphenyl-4-methyl-2-aminopentane hydrochloride (10.7 g., 0.05 mole) is converted to an ethereal solution (30 ml.) of the base by substantially the same method described in Example 1, Step E. The concentrated ether solution then is added to a solution of maleic anhydride (4.9 g., 0.05 mole) in ether (30 ml.). The solid which separates is crystallized by suspending the product in boiling hexane, adding benzene to the boiling mixture until all the product dissolves and cooling to precipitate the product, yielding 9.6 g. of the α-isomer of N-(1,3-dimethyl-2-p-butoxyphenylbutyl)-maleamic acid, M.P. 117–118° C.

*Analysis.*—Calculated for $C_{20}H_{29}NO_4$: C, 69.15; H, 8.41; N, 4.03. Found: C, 69.33; H, 8.36; N, 4.03.

EXAMPLE 16

N-(1,2-dimethyl-2-p-chlorophenyl-2-phenylethyl)-maleamic acid

*Step A.*—By replacing the p-butoxybenzaldehyde employed in Example 15, Step A, by an equimolecular quantity of p-chlorobenzaldehyde and following substantially the same procedures described in Example 15, Steps A and B, there is obtained 1-p-chlorophenyl-2-propanone.

*Step B.*—The ketone thus obtained is reacted with bromine to form the α-bromo-ketone which is reacted with benzene in the presence of aluminum chloride to obtain 1-phenyl-1-p-chlorophenyl-2-propanone. The latter is treated with methyl iodide in the presence of potassium tert.-butoxide in tert.-butyl alcohol as in Example 15, Step C, to obtaine 3-p-chlorophenyl-3-phenyl-2-butanone.

*Step C.*—By replacing the ketone used in Example 15, Step D, by an equimolecular quantity of the 3-p-chlorophenyl-3-phenyl-2-butanone obtained as described above and following substantially the same procedures described in Example 15, Steps D and E, there is obtained the α-isomer of N-(1,2-dimethyl-2-p-chlorophenyl-2-phenylethyl)-maleamic acid.

EXAMPLE 17

N-(1,2-dimethyl-2-m-bromophenyl-2-phenylethyl)-maleamic acid

*Step A.*—By replacing the p-butoxybenzaldehyde employed in Example 15, Step A, by an equimolecular quantity of m-bromobenzaldehyde and following substantially the same procedure described in Example 15, Step A, there is obtained 1-m-bromophenyl-2-nitro-1-propene.

*Step B.*—The thus obtained nitropropene is hydrogenated in the presence of iron powder and hydrochloric acid by substantially the same method described in Example 15, Step B, yielding 1-m-bromophenyl-2-propanone which is reacted with bromine to produce 1-m-bromophenyl-1-bromo-2-propanone.

*Step C.*—The 1-m-bromophenyl-1-bromo-2-propanone is reacted with benzene in the presence of aluminum chloride by substantially the same method described in Example 16, Step B, yielding 1-m-bromophenyl-1-phenyl-2-propanone which then is alkylated with methyl iodide by substantially the same method described in Example 15, Step C, yielding 1-m-bromophenyl-1-methyl-1-phenyl-2-propanone.

*Step D.*—By replacing the ketone employed in Example 15, Step D, by an equimolecular quantity of the 1-m-bromophenyl-1-methyl-1-phenyl-2-propanone produced as described above and following substantially the same procedures described in Example 15, Steps D and E, there is obtained the α-isomer of N-(1,2-dimethyl-2-m-bromophenyl-2-phenylethyl)-maleamic acid.

EXAMPLE 18

N-(1,3-dimethyl-2-p-tolylbutyl)-maleamic acid

By replacing the p-butoxybenzaldehyde employed in Example 15, Step A, by an equimolecular quantity of p-tolualdehyde and following substantially the same procedures described in Example 15, Steps A through E, there is obtained the α-isomer of N-(1,3-dimethyl-2-p-tolylbutyl)-maleamic acid.

EXAMPLE 19

N-(1-methyl-2,2-diphenylpropyl)-maleamic acid 3,3-diphenyl-2-aminobutane (11.25 g., 0.05 mole) is dissolved in 30 ml. of ether and reacted with a solution of maleic anhydride (0.05 mole) in 30 ml. of ether yielding 9.2 g. of N-(1-methyl-2,2-diphenylpropyl)-maleamic acid, M.P. 184–185° C., after crystallization from alcohol.

*Analysis.*—Calculated for $C_{20}H_{21}NO_3$: C, 74.28; H, 6.55; N, 4.33. Found: C, 74.32; H, 6.57; N, 4.31.

EXAMPLE 20

N-(1-propyl-2,2-diphenylpropyl)-maleamic acid

The addition of propylmagnesium bromide to α,α-diphenylpropionitrile following the usual procedure for a Grignard reaction followed by hydrogenation of the resulting ketimine of 2,2-diphenyl-3-hexanone using substantially the same method described by Pickard [J. Amer. Chem. Soc. 75: 2148 (1953)] yields 2,2-diphenyl-3-aminohexane, B.P. 145–150° C. (0.75 mm.). This amine (5.06 g., 0.02 mole) is dissolved in 30 ml. of ether and reacted with a solution of maleic anhydride (0.02 mole) in ether (30 ml.) yielding 3.1 g. of N-(1-propyl-2,2-diphenylpropyl)-maleamic acid, M.P. 199–200° C., after crystallization from absolute alcohol.

*Analysis.*—Calculated for $C_{22}H_{25}NO_3$: C, 75.18; H, 7.17; N, 3.99. Found: C, 75.09; H, 7.24; N, 4.01.

EXAMPLE 21

N-(1-methyl-2,2-diphenylbutyl)-maleamic acid

By substituting α,α-diphenylbutyronitrile and methylmagnesium iodide respectively for the α,α-diphenylpropionitrile and propylmagnesium bromide employed in Example 20, and following substantially the same procedures described in Example 20, there is obtained 3,3-diphenyl-2-aminopentane, B.P. 110–115° C. (0.3 mm.). The amine thus obtained (4.08 g., 0.017 mole) is dissolved in 30 ml. of ether and reacted with a solution of maleic anhydride (0.017 mole) in ether (30 ml.) yielding 3 g. of N-(1-methyl-2,2-diphenylbutyl)-maleamic acid, M.P. 196–197° C., after crystallization from ethanol.

*Analysis.*—Calculated for $C_{21}H_{23}NO_3$: C, 74.75; H, 6.87; N, 4.15. Found: C, 74.62; H, 6.83; N, 4.13.

EXAMPLE 22

N-(2,2-diphenyl-3-methylbutyl)-maleamic acid

*Step A.*—α,α-Diphenyl-β-methylbutyronitrile is added to absolute ethanol in a stainless steel-lined rocking pressure vessel. Raney nickel is added and the nitrile hydrogenated at 150° C. under an initial hydrogen pressure of 1,100 p.s.i. yielding 2,2-diphenyl-3-methyl-1-aminobutane (79% yield), B.P. 153–158° C. (8 mm.). The hydrobromide addition salt, M.P. 207–209° C., was prepared in the usual manner.

*Analysis.*—Calculated for $C_{17}H_{21}N \cdot HBr$: N, 4.37. Found: N, 4.26.

*Step B.*—The thus obtained 2,2-diphenyl-3-methyl-1-aminobutane (7.29 g., 0.03 mole) is dissolved in 30 ml. of ether and reacted with a solution of maleic anhydride (0.03 mole) in ether (30 ml.) yielding 5 g. of N-(2,2-diphenyl-3-methylbutyl)-maleamic acid, M.P. 143–144° C., after crystallization from isopropyl alcohol.

*Analysis.*—Calculated for $C_{21}H_{23}NO_3$: N, 4.15. Found: N, 4.13.

EXAMPLE 23

N-(1,2-diphenylethyl)-maleamic acid 1,2-diphenylethylamine hydrochloride (11.68 g., 0.05 mole) is converted to an ether solution (30 ml.) of the base by substantially the same method described in Example 1, Step E. The ether solution of the base then is added to a solution of maleic anhydride (4.9 g., 0.05 mole) in ether (30 ml.) yielding 12.4 g. of N-(1,2-diphenylethyl)-maleamic acid, M.P. 164–165° C., after crystallization from ethanol.

*Analysis.*—Calculated for $C_{18}H_{17}NO_3$: C, 73.20; H, 5.80; N, 4.74. Found: C, 73.50; H, 5.80; N. 4.71.

EXAMPLE 24

*N-(1-methyl-2,2-diphenylethyl)-maleamic acid*

1,1-diphenyl-2-aminopropane (10.55 g., 0.05 mole) is dissolved in ether (30 ml.) and reacted with a solution of maleic anhydride (4.9 g., 0.05 mole) in ether (30 ml.) yielding 13 g. of N-(1-methyl-2,2-diphenylethyl)-maleamic acid, M.P. 206–207° C. The maleamic acid thus obtained is very insoluble in organic solvents and is purified by repeated digestion with acetone.

*Analysis.*—Calculated for $C_{19}H_{19}NO_3$: C, 73.76; H, 6.19; N, 4.53. Found: C, 74.01; H, 6.26; N, 4.56.

EXAMPLE 25

*N-(1-ethyl-2,2-diphenylpropyl)-maleamic acid*

By following substantially the same procedures described in Example 20, α,α-diphenylpropionitrile is condensed with ethylmagnesium bromide and the resulting ketimine of 2,2-diphenyl-3-pentanone is hydrogenated to yield 2,2-diphenyl-3-aminopentane, B.P. 120–125° C. (0.5 mm.). The aminopentane thus obtained (5 g., 0.02 mole) is dissolved in 30 ml. of ether and reacted with a solution of maleic anhydride (0.02 mole) in ether (30 ml.) yielding 2.6 g. of N-(1-ethyl-2,2-diphenylpropyl)-maleamic acid, M.P. 198–199° C., after crystallization from absolute alcohol.

*Analysis.*—Calculated for $C_{21}H_{23}NO_3$: C, 74.75; H, 6.87; N, 4.15. Found: C, 74.77; H, 6.96; N, 4.15.

EXAMPLE 26

*N-(1-n-butyl-2,2-diphenylpropyl)-maleamic acid*

By following substantially the same procedures described in Example 20, α,α-diphenylpropionitrile and butylmagnesium bromide are reacted to form the ketimine of 2,2-diphenyl-3-heptanone which is hydrogenated to yield 2,2-diphenyl-3-aminoheptane, B.P. 150–155° C. (0.6 mm.). The aminoheptane thus obtained (5.34 g., 0.02 mole) is dissolved in ether (30 ml.) and reacted with a solution of maleic anhydride (0.02 mole) in ether (30 ml.) to yield 1.5 g. of N-(1-n-butyl-2,2-diphenylpropyl)-maleamic acid, M.P. 170–171° C., after crystallization from ethanol.

*Analysis.*—Calculated for $C_{23}H_{27}NO_3$: C, 75.59; H, 7.45; N, 3.83. Found: C, 75.50; H, 7.46; N, 3.78.

EXAMPLE 27

*N-(1-methyl-2,2-diphenylpentyl)-maleamic acid*

*Step A.*—By following substantially the same procedure described in Example 20, α,α-diphenylcapronitrile is reacted with methylmagnesium iodide and the resulting ketimine of 3,3-diphenyl-2-hexanone is hydrogenated to yield 3,3-diphenyl-2-aminohexane, B.P. 115–120° C. (0.2 mm). The phenylthiourea derivative of 3,3-diphenyl-2-aminohexane, prepared by the method described in "Identification of Organic Compounds," Shriner and Fuson, 2nd edition, John Wiley & Sons (1940), page 148, has M.P. 191–192° C.

*Analysis.*—Calculated for $C_{20}H_{27}N_2S$: C, 77.56; H, 7.51; N, 6.96. Found: C, 77.33; H, 7.82; N, 6.99.

*Step B.*—The 3,3-diphenyl-2-aminohexane (10.6 g., 0.04 mole) is dissolved in ether (30 ml.) and reacted with a solution of maleic anhydride (0.04 mole) in ether (30 ml.) yielding 4.85 g. of N-(1-methyl-2,2-diphenylpentyl)-maleamic acid, M.P. 171–172° C., after crystallization from ethanol.

*Analysis.*—Calculated for $C_{23}H_{27}NO_3$: C, 75.59; H, 7.45; N, 3.83. Found: C, 75.69; H, 7.45; N, 3.83.

EXAMPLE 28

*N-(1-ethyl-2,2-diphenylbutyl)-maleamic acid*

By following substantially the same procedures described in Example 20, α,α-diphenylbutyronitrile is reacted with ethylmagnesium bromide and the ketimine of 3,3-diphenyl-4-hexanone thus obtained is hydrogenated to yield 3,3-diphenyl-4-aminohexane, B.P. 153–160° C. (1.25 mm.). The aminohexane thus obtained (5.04 g., 0.02 mole) is dissolved in 30 ml. of ether and reacted with a solution of maleic anhydride (0.02 mole) in ether (30 ml.) to yield 2.6 g. of N-(1-ethyl-2,2-diphenylbutyl)-maleamic acid, M.P. 213–214° C., after crystallization from ethanol.

*Analysis.*—Calculated for $C_{22}H_{25}NO_3$: C, 75.18; H, 7.17; N, 3.99. Found: C, 75.05; H, 7.30; N, 3.98.

EXAMPLE 29

*N-(2,2-diphenyl-2-hydroxyethyl)-maleamic acid*

2,2-diphenyl-2-hydroxyethylamine (4.26 g., 0.02 mole) is dissolved in ether (30 ml.) and reacted with a solution of maleic anhydride (1.96 g., 0.02 mole) in ether (30 ml.) yielding 2.6 g. of N-(2,2-diphenyl-2-hydroxyethyl)-maleamic acid, M.P. 169–170° C., after crystallization from ethanol.

*Analysis.*—Calculated for $C_{18}H_{17}NO_4$: C, 69.44; H, 5.50; N, 4.50. Found: C, 69.57; H, 5.60; N, 4.48.

EXAMPLE 30

*N-(1-methyl-2-benzyl-3-phenylpropyl)-maleamic acid*

1-phenyl-2-benzyl-3-butanone is converted by the Leuckart reaction in substantially the same manner described in Example 1, Step B, to 1-phenyl-2-benzyl-3-aminobutane hydrochloride. The hydrochloride salt is converted to the free base by substantially the same procedure described in Example 1, Step E, B.P. 193–198° C. (15 mm.). The aminobutane thus obtained (4.8 g., 0.02 mole) is dissolved in ether (30 ml.) and reacted with a solution of maleic anhydride (0.02 mole) in ether (30 ml.) yielding 3.5 g. of N-(1-methyl-2-benzyl-3-phenylpropyl)-maleamic acid, M.P. 142–143° C., after crystallization from a mixture of benzene-hexane by the method described in Example 15, Step E.

*Analysis.*—Calculated for $C_{21}H_{23}NO_3$: C, 74.75; H, 6.87; N, 4.15. Found: C, 74.77; H, 6.96; N, 4.15.

EXAMPLE 31

*N-(1-benzyl-3-phenylpropyl)-maleamic acid*

1,4-diphenyl-2-aminobutane (11.25 g., 0.05 mole) is dissolved in ether (30 ml.) and reacted with a solution of maleic anhydride (4.9 g., 0.05 mole) in ether (30 ml.) yielding 10.7 g. of N-(1-benzyl-3-phenylpropyl)-maleamic acid, M.P. 133–135° C., after crystallization from a mixture of benzene-hexane by the method described in Example 15, Step E.

*Analysis.*—Calculated for $C_{20}H_{21}NO_3$: C, 74.28; H, 6.55; N, 4.33. Found: C, 74.49; H, 6.70; N. 4.35.

EXAMPLE 32

*N-(1-n-propyl-3-phenylpropyl)-maleamic acid*

1-phenyl-3-hexanone (26.7 g., 0.15 mole) is submitted to a Leuckart reaction in substantially the same manner described in Example 1, Step B, yielding 15 g. of 1-phenyl-3-aminohexane hydrochloride. The hydrochloride salt is converted to the free base described in Example 1, Step E, B.P. 142° C. (25 mm.). The aminohexane thus obtained (5.3 g., 0.03 mole) is dissolved in ether (30 ml.) and reacted with a solution of maleic anhydride (0.03 mole) in ether (30 ml.) yielding 2.55 g. of N-(1-n-propyl-3-phenylpropyl)-maleamic acid, M.P. 101–102° C., after crystallization from a 5:1 mixture of ether-benzene.

*Analysis.*—Calculated for $C_{16}H_{21}NO_3$: C, 69.79; H, 7.69; N, 5.09. Found: C, 69.88; H, 7.61; N, 5.07.

EXAMPLE 33

N-(1,3-diphenylpropyl)-maleamic acid 1,3-diphenyl-1-aminopropane hydrochloride (7.42 g., 0.03 mole) is converted to an ether solution (30 ml.) of the base by substantially the same method described in Example 1, Step E. The ether solution of the base thus obtained is reacted with a solution of maleic anhydride (2.94 g., 0.03 mole) in ether (30 ml.) yielding 6.2 g. of N-(1,3-diphenylpropyl)-maleamic acid, M.P. 151–152° C., after crystallization from a 5:2 mixture of alcohol-water.

*Analysis.*—Calculated for $C_{19}H_{19}NO_3$: C, 73.76; H, 6.19; N, 4.53. Found: C, 73.87; H, 6.05; N, 4.57.

EXAMPLE 34

N-(1-isopropyl-3-phenylpropyl)-maleamic acid

*Step A.*—Isopropyl 2-phenylethyl ketone (55 g.) is submitted to the Leuckart reaction in substantially the same manner described in Example 1, Step B, to form 1-phenyl-4-methyl-3-aminopentane hydrochloride. The hydrochloride salt is converted to the free base by substantially the same procedure described in Example 1, Step E, yielding (33 g.) of the free base, B.P. 90–95° C. (0.4 mm.). The hydrochloride of the aminopentane is prepared by the usual method and melts at 195–196° C. after crystallization from benzene.

*Analysis.*—Calculated for $C_{12}H_{19}N \cdot HCl$: C, 67.44; H, 9.43; N, 6.55. Found: C, 67.62; H, 9.66; N, 6.57.

*Step B.*—The 1-phenyl-4-methyl-3-aminopentane obtained as described in Step A above (8.85 g., 0.05 mole) is dissolved in ether (30 ml.) and reacted with a solution of maleic anhydride (0.05 mole) in ether (30 ml.) yielding N-(1-isopropyl-3-phenylpropyl)-maleamic acid (10.9 g.), M.P. 114–115° C., after crystallization from a mxiture of benzene-hexane by the method described in Example 15, Step E.

*Analysis.*—Calculated for $C_{16}H_{21}NO_3$: C, 69.79; H, 7.69; N, 5.09. Found: C, 69.94; H, 7.59; N, 5.08.

EXAMPLE 35

N-(1-methyl-3,3-diphenylpropyl)-maleamic acid 1,1-diphenyl-3-aminobutane (11.25 g., 0.05 mole) is dissolved in ether (30 ml.) and reacted with a solution of maleic anhydride (0.05 mole) in ether (30 ml.) yielding 7.0 g. of N-(1-methyl-3,3-diphenylpropyl)-maleamic acid, M.P. 113–114° C., after crystallization from a mixture of benzene-hexane by the method described in Example 15, Step E.

*Analysis.*—Calculated for $C_{20}H_{21}NO_3$: C, 74.28; H, 6.55; N, 4.33. Found: C, 74.26; H, 6.50; N, 4.33.

EXAMPLE 36

N-(1-propyl-3,3-diphenylpropyl)-maleamic acid

Phenylmagnesium bromide is reacted with 1-phenyl-1-hexene-3-one using substantially the same method described by Kohler [Amer. Chem. Jr. 38: 513, 533 (1907)] yielding 1,1-diphenyl-3-hexanone, B.P. 135–140° C. (0.2 mm.). The hexanone thus obtained is submitted to a Leuckart reaction in substantially the same manner described in Example 1, Step B, to yield 1,1-diphenyl-3-aminohexane hydrochloride. The hydrochloride salt is converted to the free base by substantially the same procedure described in Example 1, Step E, B.P. 145–150° C. (0.3 mm.). The aminohexane thus obtained (7.59 g., 0.03 mole) is dissolved in ether (30 ml.) and reacted with a solution of maleic anhydride (0.03 mole) in ether (30 ml.) to yield 5.1 g. of N-(1-propyl-3,3-diphenylpropyl)-maleamic acid, M.P. 125–126° C., after crystallization from a mixture of benzene-hexane by the method described in Example 15, Step E.

*Analysis.*—Calculated for $C_{22}H_{25}NO_3$: C, 75.18; H, 7.17; N, 3.99. Found: C, 75.18; H, 7.08; N, 4.02.

EXAMPLE 37

N-(1-isopropyl-3,3-diphenylpropyl)-maleamic acid

*Step A.*—2,2-diphenylethyl isopropyl ketone is submitted to a Leuckart reaction by substantially the same method described in Example 1, Step B, to yield 1,1-diphenyl-4-methyl-3-aminopentane hydrochloride. The hydrochloride salt is converted to the free base by substantially the same procedure described in Example 1, Step E, B.P. 142–150° C. (0.3 mm.). The phenyl thiourea derivative of the aminopentane, prepared by the method identified in Example 22, has M.P. 207–208° C.

*Analysis.*—Calculated for $C_{19}H_{24}N_2S$: C, 80.61; H, 7.58; N, 7.52. Found: C, 80.58; H, 7.61; N, 7.51.

*Step B.*—The aminopentane obtained as described in Step A above (12.65 g., 0.05 mole) is dissolved in 30 ml. of ether and reacted with a solution of maleic anhydride (0.05 mole) dissolved in ether (30 ml.) to yield 13.3 g. of N-(1-isopropyl-3,3-diphenylpropyl)-maleamic acid, M.P. 132–133° C.

*Analysis.*—Calculated for $C_{22}H_{25}NO_3$: C, 75.18; H, 7.17; N, 3.99. Found: C, 75.08; H, 7.02; N, 3.96.

EXAMPLE 38

N-(1-tert. butyl-3,3-diphenylpropyl)-maleamic acid

*Step A.*—2,2-diphenylethyl tert. butyl ketone is submitted to a Leuckart reaction in substantially the same manner as described in Example 1, Step B, to yield 2,2-dimethyl-5,5-diphenyl-3-aminopentane hydrochloride. The hydrochloride salt is converted to the free base by substantially the same procedure described in Example 1, Step E, B.P. 128–130° C. (0.2 mm.). After crystallization from hexane, the aminobutane melts at 78–80° C.

*Analysis.*—Calculated for $C_{19}H_{25}N$: C, 85.34; H, 9.42; N, 5.25. Found: C, 85.40; H, 9.51; N, 5.21.

*Step B.*—The thus obtained 2,2-dimethyl-5,5-diphenyl-3-aminopentane (8.01 g., 0.03 mole) is dissolved in 30 ml. of ether and reacted with a solution of maleic anhydride (0.3 mole) in ether (30 ml.) to yield 8.8 g. of N-(1-tert. butyl-3,3-diphenylpropyl)-maleamic acid, M.P. 191.5–193° C., after crystallization from absolute ethanol.

*Analysis.*—Calculated for $C_{23}H_{27}NO_3$: C, 75.59; H, 7.45; N, 3.83. Found: C, 75.31; H, 7.37; N, 3.83.

EXAMPLE 39

N-(1-cyclohexyl-3,3diphenylpropyl)-maleamic acid

*Step A.*—β,β-Diphenylpropionamide is dehydrated by heating with an equimolecular amount of phosphorus oxychloride at 80° C. for three hours. The reaction mixture is treated with ice water and the β,β-diphenylpropionitrile is extracted with benzene. After drying over sodium sulfate, the benzene is evaporated and the residue is crystallized from benzene-hexane to obtain β,β-diphenylpropionitrile, M.P. 86–87° C.

*Analysis.*—Calculated for $C_{15}H_{13}N$: C, 86.92; H, 6.32; N, 6.76. Found: C, 87.10; H, 6.30; N, 6.76.

*Step B.*—The thus obtained β,β-diphenylpropionitrile is reacted with cyclohexylmagnesium bromide by the method described in Example 20 yielding the corresponding ketimine which is hydrolyzed by heating overnight with dilute hydrochloric acid yielding 1-cyclohexyl-3,3-diphenyl-1-propanone, M.P. 63–64° C., after crystallization from ligroin.

*Analysis.*—Calculated for $C_{21}H_{24}O$: C, 86.25; H, 8.27. Found: C, 86.21; H, 8.18.

*Step C.*—The thus obtained 1-cyclohexyl-3,3-diphenyl-1-propanone (29.1 g.) is submitted to a Leuckart reaction by substantially the same method described in Example 1, Step B, yielding 11.8 g. of 1-cyclohexyl-3,3-diphenyl-1-aminopropane hydrochloride. The hydrochloride salt is converted to the free base by substantially the same procedure described in Example 1, Step E, B.P. 180–181° C. (0.5 mm.).

*Step D.*—The thus obtained aminopropane (5.8 g.) is dissolved in 30 ml. of ether and reacted with a solution of an equimolecular quantity of maleic anhydride in ether (30 ml.) yielding 5.1 g. of N-(1-cyclohexyl-3,3-diphenylpropyl)-maleamic acid, M.P. 202–203° C., after crystallization from absolute alcohol.

*Anaylsis.*—Calculated for $C_{25}H_{29}NO_3$: C, 76.69; H, 7.47; N, 3.58. Found: C, 76.73; H, 7.49; N, 3.59.

EXAMPLE 40

*N-(1-methyl-2,2,3-triphenylpropyl)maleamic acid*

*Step A.*—3,3,4-triphenyl-2-butanone (15.0 g., 0.05 mole), is converted to its oxime by essentially the same procedure described in Example 2, Step A. The ether is evaporated from the ether solution of the 3,3,4-triphenyl-2-butanone oxime obtained from the reaction work-up and the residue crystallized from cyclohexane yielding 10.1 g. (64%) of oxime, M.P. 118–122° C. After purification by recrystallization from cyclohexane and drying at 80° C. in vacuo the oxime melts at 151–153° C.

*Analysis.*—Calculated for $C_{22}H_{21}NO$: C, 83.77; H, 6.71. Found: C, 83.12; H, 6.74.

*Step B.*—The 3,3,4-triphenyl-2-butanone oxime from Step A (10.0 g.) is hydrogenated in alcohol solution using Raney nickel catalyst, by essentially the same procedure described in Example 2, Step B. After removal of the catalyst and alcohol from the solution, a residue of 3,3,4-triphenyl-2-aminobutane (7.7 g.) remains as a viscous oil which slowly crystallizes.

*Step C.*—A solution of 3,3,4-triphenyl-2-aminobutane (5.9 g.) in 35 ml. of ether is added to a solution of maleic anhydride (2.4 g.) in 30 ml. of ether. After three hours the reaction is complete and yields 6.9 g. of crystalline N-(1-methyl-2,2,3-triphenylpropyl)maleamic acid. For final purification, this product is recrystallized from isopropyl alcohol, M.P. 168–172° C.

*Analysis.*—Calculated for $C_{26}H_{25}NO_3$: C, 78.17; H, 6.31; N, 3.51. Found: C, 78.32; H, 6.48; N, 3.44.

The various alkali metal salts of N-substituted maleamic acid of this invention can all be prepared by the following method or by other methods usually employed for making alkali metal salts of carboxylic acids.

EXAMPLE 41

*Sodium salt of the α-isomer of N-(1-methyl-2,3-di-p-chlorophenylpropyl)-maleamic acid*

The α-isomer of N-(1-methyl-2,3-di-p-chlorophenylpropyl)-maleamic acid (1.75 g., 0.00445 mole), prepared as described in either Example 1 or 2, is added to a solution of sodium hydroxide (0.17 g., 0.00425 mole) in 180 ml. of water. The mixture is heated to 80° C. and shaken until no more of the acid will dissolve; pH of solution 8.0. The small amount of undissolved acid is removed by filtration, and the clear filtrate evaporated under reduced pressure at 80° C. The gummy residue obtained is taken up in absolute alcohol and the solvent then evaporated on the steam bath. The residue is permitted to stand at room temperature exposed to the air for five days yielding a clear, glassy material which is readily powdered yielding the sodium salt of the α-isomer of N-(1-methyl-2,3-di-p-chlorophenylpropyl)-maleamic acid in the form of a white powder.

The novel N-substituted maleamic acids of this invention can be administered in any of the usual phamaceutical dosage forms such as in the form of a sterile solution for intravenous use particularly in the form of the alkali metal salt of the selected N-substituted maleamic acid or in the form of a compressed tablet, a dry-filled capsule, syrup, and the like for oral administration. The amount of any particular compound that is needed will vary depending upon the selected compound, the patient, and the therapeutic result desired and therefore the dosage will need to be adjusted symptomatically by the physician. In general, dosages between about 25 mg. to about 8 g. per day can be employed to produce the desired therapeutic effect. These recommended dosages appear to be well below the toxic dose of the compounds as evidenced by the fact the acute intravenous $LD_{50}$ in mice of one of the compounds falling within the scope of this invention, that is the sodium salt of the α-isomer of N-(1-methyl-2,3-di-p-chlorophenylpropyl)-maleamic acid, was found to be 288 mg./kg. and the oral $LD_{50}$ of the same salt was 900 mg./kg. The oral $LD_{50}$ in mice of the free acid was greater than 10 g./kg. No toxic reactions were observed when the free acid form of the above compound was administered orally to dogs at a dosage level of 400 mg./kg./day for 16 days, nor were toxic effects noted when the free acid form of the compound was administered orally to rats at a dosage level of 3,000 mg./kg./day for 14 days.

The following examples will illustrate suitable methods for preparing phamaceutical dosage forms of the compounds of this invention. While the following examples illustrate compounding one particular compound falling within the scope of this invention; as all of the compounds have substantially the same properties any one of the novel compounds of this invention can be substituted for the particular compound identified in the following examples to prepare similar suitable pharmaceutical dosage forms.

EXAMPLE 42

*Sterile solutions, 5%, for intravenous use*

Benzmalence _____ g__ 5
Sodium hydroxide solution to _____ pH__ 10.4
Pyrogen-free distilled water, q.s. 100 ml.

The benzmalecene [the generic name assigned to the compound N-(1-methyl-2,3-di-p-chlorophenylpropyl)-maleamic acid, α-isomer] prepared as described in Examples 1 or 2, is suspended in about 50 ml. of water and the sodium hydroxide solution added with agitation to pH 10.4. The solution then is filtered through Pyrex ultra fine filter to sterilize and then is filled into sterile glass containers each containing 10 cc. of solution suitable for intravenous use.

EXAMPLE 43

*Compressed tablets, 50 mg.*

|  | G. |
|---|---|
| Benzmalecene | 500 |
| Lactose | 650 |
| Calcium phosphate dibasic | 200 |
| Starch, dried | 75 |
| Acacia powder | 25 |
| Starch paste | 72.5 |
| Add | |
| Starch, dried | 30 |
| Magnesium stearate | 7.5 |

The powders are mixed and passed through a No. 60 screen and the mixture thus obtained is granulated with starch paste and passed through a No. 12 screen and air dried. The granules then are screened through a No. 18 screen and the starch and the magnesium stearate are screened through a No. 60 screen onto the granules. The granulation then is compressed into tablets using ⁹⁄₃₂″ flat-faced, bevelled-edge, scored punches and dies yielding 10,000 tablets each containing 50 mg. of benzmalecene.

EXAMPLE 44

*Dry, filled capsules, 250 mg.*

| | G. |
|---|---|
| Benzmalecene | 2500 |
| Magnesium stearate | 25 |

The magnesium stearate and benzmalecene are intimately mixed and filled into 1,000 No. 1 clear gelatin capsules on an automatic capsule filling machine, each capsule containing 250 mg. of active material.

EXAMPLE 45

*Syrup containing 50 mg. active material per 5 cc.*

| | | |
|---|---|---|
| Benzmalecene | g | 10 |
| Sorbitol 70% w./v. solution | cc | 300 |
| Methylparaben, U.S.P. | g | 1.2 |
| Benzoic acid | g | 1.0 |
| Ethyl alcohol, 95% | cc | 10 |
| Tragacanth powder | g | 4.0 |
| Glycerin, U.S.P. | g | 50 |

Flavors, q.s.
Color, q.s.
Distilled water, q.s. 1,000 cc.

A slurry of tragacanth in glycerin is added to half the water with mixing until dissolved. A solution of methylparaben and benzoic acid in alcohol then is added. The benzmalecene, wet with part of the sorbitol solution, is added to the above solution and the balance of the sorbitol solution, flavors, color, and the remainder of the water are added. The suspension is passed through a homogenizer and filled into sterile glass containers.

While the above examples describe the preparation of certain illustrative compounds falling within the scope of the generic structure on page 1, and certain specific dosage forms suitable for administering the novel compounds of this invention in human therapy, it is to be understood that the invention is not to be limited by these examples or by the specific reaction conditions described for the preparation of the compounds or by the specific ingredients included in the pharmaceutical preparations but it is understood to embrace variations and modifications falling within the scope of the appended claims.

This application is a continuation-in-part of our copending U.S. patent application 726,056, filed April 3, 1958.

What is claimed is:

1. N-substituted maleamic acids selected from the class consisting of compounds having the formula

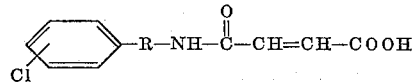

and alkali metal salts thereof, wherein Y is selected from the group consisting of hydrogen, chlorine, and bromine; and R is an alkylene radical having the structure

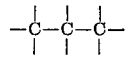

and having at least two and no more than three carbon atoms in a straight chain between the phenyl radical and the nitrogen atom of the maleamic acid residue each remaining valence of said radical being satisfied by a radical selected from the group consisting of hydrogen, a lower alkyl, phenyl, chlorophenyl, bromophenyl, benzyl, chlorobenzyl, and bromobenzyl radicals.

2. N-substituted maleamic acids having the formula

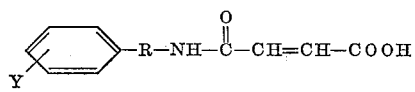

wherein R is an alkylene radical having two carbon atoms in a straight chain between the phenyl radical and the nitrogen atom of the maleamic acid residue, the four remaining valences of said radical being satisfied by only two hydrogen atoms, a lower alkyl radical, and a chlorobenzyl radical.

3. N-substituted-maleamic acids having the formula

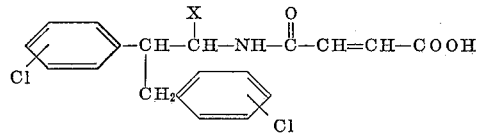

wherein X is a lower alkyl radical.

4. N-(1 - methyl - 2,3 - di-p-chlorophenylpropyl)-maleamic acid.

5. The α-isomer of N-(1-methyl-2,3-di-p-chlorophenylpropyl)-maleamic acid.

6. The β-isomer of N-(1-methyl-2,3-di-p-chlorophenylpropyl)-maleamic acid.

7. N-substituted-maleamic acid having the formula

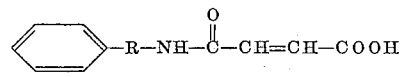

wherein R is an alkylene radical having two carbon atoms in a straight chain between the phenyl radical and the nitrogen atom of the maleamic acid residue, the four remaining valences of said alkylene radical being satisfied by only two hydrogen atoms, a lower alkyl radical and a chlorobenzyl radical.

8. N-substituted-maleamic acids having the formula

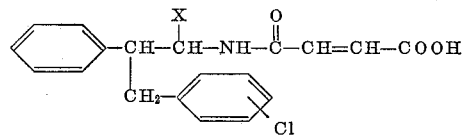

wherein X is a lower alkyl radical.

9. N-(1-methyl - 3 - p - chlorophenyl-2-phenylpropyl)-maleamic acid.

10. N-substituted-maleamic acids having the formula

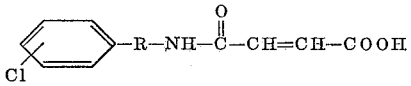

wherein R is an alkylene radical having two carbon atoms in a straight chain between the phenyl radical and the nitrogen atom of the maleamic acid residue, the four remaining valences of said radical being satisfied by only two hydrogen atoms, a lower alkyl radical, and a benzyl radical.

11. N-substituted-maleamic acids having the formula

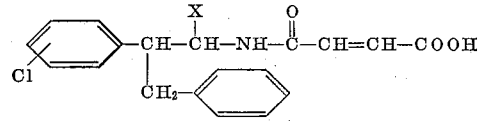

wherein X is a lower alkyl radical.

12. N-(1-methyl - 2 - p - chlorophenyl-3-phenylpropyl)-maleamic acid.

13. N-(1-methyl-2,3-diphenylpropyl)maleamic acid.

14. N-(1-methyl-2,2,3-triphenylpropyl)maleamic acid.

References Cited by the Examiner

UNITED STATES PATENTS 3,018,292   1/1962   Sauers et al. _____ 260—518

OTHER REFERENCES

Frankel et al.: J. Am. Chem. Soc. 75, 331 (1953).

LEON ZITVER, *Primary Examiner.*

CHARLES B. PARKER, *Examiner.*